Feb. 13, 1940. E. WHITBY ET AL 2,190,497
MAXIMUM DEMAND INDICATOR
Filed April 21, 1938
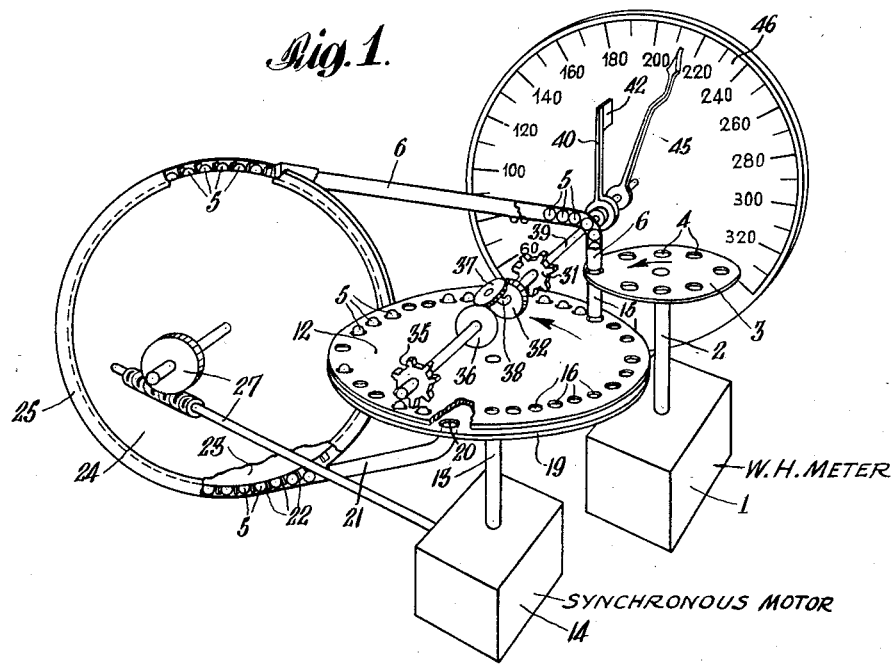

Patented Feb. 13, 1940

2,190,497

UNITED STATES PATENT OFFICE 2,190,497

MAXIMUM DEMAND INDICATOR

Ernest Whitby, London, and Lionel Barton Swan Golds, Warlingham, England, assignors to Landis & Gyr, A-G., a corporation of Switzerland Application April 21, 1938, Serial No. 203,260
In Great Britain April 29, 1937

7 Claims. (Cl. 171—34)

The invention relates to a new and useful improvement in methods and mechanism for indicating maximum demands in energy consumption, and more particularly to a novel method and means for determining and indicating the actual demands made in any time period of the predetermined base length.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel steps, methods, mechanisms and combinations hereinafter shown and described.

The accompanying drawing, referred to herein and constituting a part hereof, illustrate one manner of practicing the method, and a form of mechanism, capacitated for use with said method, and also embodying certain features of the invention; the drawing, together with the description, serving to explain the principles of the invention.

Of the drawing:

Fig. 1 is a diagrammatic isometric perspective of a mechanism embodying mechanical features of the invention and capacitated for use in practicing the method of the invention;

Fig. 2 is a plan of a modified form of a part of the mechanism shown in Fig. 1; and Fig. 3 is a section on line 3—3 of Fig. 2.

For the purpose of determining the charge for electrical energy consumed in electrical installations according to a tariff based on a maximum demand made in a predetermined time period, it is desirable to accurately determine the actual maximum demand during any elapsed period of time equal to the predetermined base time period, that is, to ascertain the true or actual maximum demand. In the practice of taking indications of the maximum demand during successive arbitrarily fixed time periods, such as successive half hour periods by a clock, indicating errors of varying magnitudes are liable to occur, because the actual time period of greatest demand does not coincide wtih the arbitrarily set time periods during which indications are taken. As for example, if the consumption of an electrical installation in the period one o'clock to 1.15 is 0 kw., from 1.15 to 1.45 is 100 kw. and from 1.45 to 2 o'clock it is again 0 kw., then with half-hour measuring periods from 1 o'clock to 1.30 and from 1.30 to 2 o'clock, only 50 kw. would be indicated, whereas had the measuring period been from 1.15 to 1.45, 100 kw. would have been indicated. In the one case thus just double the consumption is indicated over the other case. To minimize errors and discrepancies in the indications obtained, use has been made of averagings or approximations of overlapping specific time periods, the indications of which are taken for successive artbitrarily fixed time periods, in order to more nearly approach the true maximum demand. This is overly elaborate and troublesome and involves great mechanical complications.

Our invention provides a method which determines and indicates the actual maximum energy demand during any period of elapsed time equal to the predetermined base period, without reference to conventional or arbitrary time indications or periods. For example, if thirty minutes be the predetermined base time period, our invention will indicate the maximum energy demand which occurs in any thirty-minute period, and entirely independently of any clock readings or other conventional or set time indications or divisions. Thus the actual maximum demand is precisely determined and indicated. The invention also provides suitable and very simple mechanism and means for practicing the aforesaid method.

By our invention, the energy consumed is continuously measured, and an indicating device, such as an indicator hand moving over a dial, is advanced, by an independently movable actuating device, proportionately to the energy consumption, the energy consumption is continuously remeasured at the expiration of the predetermined base time period, and a proportional reverse or subtractive movement is imparted to said actuating device, which is free to move away from the indicator hand. Thus at any and every instant of time, the actual energy consumption during the just elapsed base time period is being measured and exactly indicated. Whenever that consumption falls off, the actuating device regresses and the indicator hand is not moved, but whenever that consumption increases the actuating device progresses and the hand is proportionately advanced; and so the actual maximum demand during any time equal to the base time period is exactly and permanently indicated. In carrying out the invention, the meter acts to create a mechanically cognizable record of the energy consumption by setting integrating units or devices proportionately to the energy consumption, mechanically counting and of times when observations may be made. It will be understood that the foregoing general description, and the appended detail description as well, are exemplary and explanatory but are not restrictive of the invention.

Referring now in detail to the embodiment of the invention illustrated by way of example in Fig. 1 of the drawing, suitable means for measuring the energy consumption are provided, shown conventionally as a watt hour meter 1, used in this illustrative example to measure consumption of electrical energy. Means are provided for continuously making a mechanically cognizable record of the quantity of energy consumed during a predetermined time base period, in a form such that the energy may be continuously remeasured at the expiration of the base time period. The continuous measurement of the energy consumed, together with the continuous remeasurement of that energy after a time lapse equal to the base time period are utilized cooperatively and concurrently to control and position an energy quantity indicating device in such manner that there will be permanently indicated the largest actual energy demand during any period equal to the base time period. As here embodied, the energy consumption measuring device, such as the watt hour meter 1, has connected thereto a shaft 2, upon which is mounted a disc 3, provided with a series of concentric apertures 4 designed to emit or pass devices which constitute integers of the mechanical record of the quantity of energy consumed. The rate of emission or passing of these devices is proportionate to the rotational speed of the disc 3 and, therefore, to the consumption of energy. As embodied, said devices are in the form of balls 5 fed through a vertically disposed conduit 6, with the open end of which conduit the apertures 4 in the disc 3 pass into and out of register, so that each aperture will pass one of the balls 5.

The means for creating the mechanically cognizable record of energy consumption during the predetermined time period comprises a disc 12, fixed on the shaft 13 of a constantly rotating time measuring device such as a synchronous motor 14. The time-measuring device controls the mechanical record and presents it continuously for recounting after the lapse of the predetermined time period. The disc 12 carries near its periphery a concentric series of apertures 16 of a size to receive and pass the balls 5, these balls, as they pass through the apertures 4 of disc 3, being delivered to the apertures 16 in the rotating disc 12 through a conduit 15. Positioned closely below the disc 12 is a stationary supporting plate 19, whereby the balls 5 are supported and retained in, and project upwardly from, the apertures 16, as the disc 12 rotates, the balls rolling on the upper surface of the stationary plate 19. The mechanism is constructed so that there will be carried at all times in the disc 12 the number of balls 5 corresponding to the quantity of energy balls are retained in position in the peripheral pockets 22 by a casing or housing 24 having a tubular part 25 enclosing the balls 5 and pockets 22, and through the rotation of the disc 23 the balls are returned to the conduit 6, again to be brought into operative relation with the apertures 4 in the disc 3.

Means are provided for counting and indicating the energy consumption, said means cooperating with the balls 5 in the rotating disc 12, and for transferring the indication to some suitably calibrated device indicating the consumption in energy units, which is later described more fully. In cooperation with the indicating means are means for continuously remeasuring the energy consumption after the lapse of the base time period. In said remeasuring means, as embodied, a star wheel 31 is engaged by the balls 5 at a point near where the balls are deposited in the apertures 16 by the meter rotated disc 3, each ball as it passes through the star wheel imparting rotation thereto through one tooth. The star wheel 31 has a sleeve connection to sun wheel 32 of a differential gear. On the diametrically opposite side of the disc 12 is a star wheel 35, which likewise is rotated by the balls 5 in the apertures 16 through one tooth distances, the time of travel of any given aperture 16 and its ball 5 from star wheel 31 to star wheel 35 being equal to the base time period. Star wheel 35 has a sleeve connection with the other sun wheel 36 of the differential gear. The planet wheel 37 of said differential gear is mounted on an arm 38 integral with a rod 39, which extends through the sleeve connection of star wheel 31. The indicating means hereinbefore referred to comprises an actuator which is advanced or additively moved from star wheel 31 and is retracted or subtractively moved by the star wheel 35, both operating through the differential gear. The actuator controls a permanent indicating device, here embodied as a pointer or hand which is advanced during the advance movement of the actuator, the latter, however, retracting alone, leaving the pointer at rest showing the maximum reading. As here embodied, it comprises a radially-disposed actuator 40, which rotates with the planet gear 37. The actuator arm 40 has a laterally-extending finger 42 adapted to engage with and to angularly move a pointer or hand 45 which is mounted to be free to rotate on the rod 39. The hand 45 moves over the calibrated dial 46 to indicate the consumption in energy units.

In the operation of this mechanism, the balls 5 are dropped through the successively passing apertures 4 in the disc 3, the velocity of which is proportional to the energy consumption. These balls 5 immediately pass into the apertures 16 of rotating disc 12, and one by one rotate star wheel 31 tooth by tooth in passing. Considering the device as starting with a zero indication, actuator 40 will move pointer hand 45 ahead proportionally to the energy consumption, but when the actuator arm 40 is moved retractively the hand 45 is not affected. The time consumed by any ball 5 carried in disc 12 passing from star wheel 31 to star wheel 35 is equal to the base time period, and the ball then rotates the star wheel 35 in the opposite sense to the rotation of star wheel 31. Thus the balls 5 in passing star wheel 31 advance the planet wheel 37 on sun wheel 36, and actuator arm 40 is advanced, and will move pointer hand 45 if in contact therewith. The balls 5 as they approach star wheel 35 rotate it in the opposite direction, that is, subtractively with respect to star wheel 31, and planet wheel 37 is rolled in the opposite direction on sun wheel 32, and moves the actuator arm 40 retractively. The result is that the total advance of the actuator 45 will be equal to the greatest number of balls 5 in the apertures 16 in the rotating disc 12 between star wheel 31 and star wheel 35; in other words, the hand 45 will indicate the greatest energy consumption in any time period equal to the base period, irrespective of any conventional or other arbitrarily set time periods, as for instance hours and half hours as indicated by the clock. The pointer 45 may be manually retracted when desired or required.

The mechanism for carrying out the invention is indicated in a simple form in Fig. 1, but it will be understood that the form may be varied and the capacity of the mechanism greatly increased. One modified form of mechanism is illustrated in Figs. 2 and 3, whereby the time period between the successive countings, or the number of actuating units in the mechanical record of energy consumption during any time period equal to the base period may be increased. As there shown three rotatable discs 51, 52 and 53, similar to the disc 12, are mounted on a shaft 54 corresponding to the shaft 13. Each of these rotatable discs carries a concentric circle of apertures 55 for the balls 5. Beneath each of these rotatable discs, respectively, is a stationary plate 56, 57 and 58 for supporting the balls 5, located in the apertures 16 as they roll along. A rotatable disc 61 having apertures 62 corresponds to the disc 3. In the plate 56 beneath the disc 51 is an aperture 63 through which the balls may drop from disc 51 to disc 52. In like manner an aperture 64 permits the balls to drop from disc 52 to disc 53 and an aperture 65 permits the balls to drop from the disc 53 back into the circulating system. The first star wheel 68 cooperates with the balls very soon after they are dropped into the apertures in the disc 51, and the other star wheel 69 cooperates with the balls just before they are dropped out of the disc 53. Thus a path of any desired length, or any desired number of the mechanical energy recording and measuring units may be provided.

The invention in its broader aspects is not limited to the specific steps and mechanisms shown and described but departures may be made therefrom within the scope of the accompanying claims without departing from the principles of the invention and without sacrificing its chief advantages.

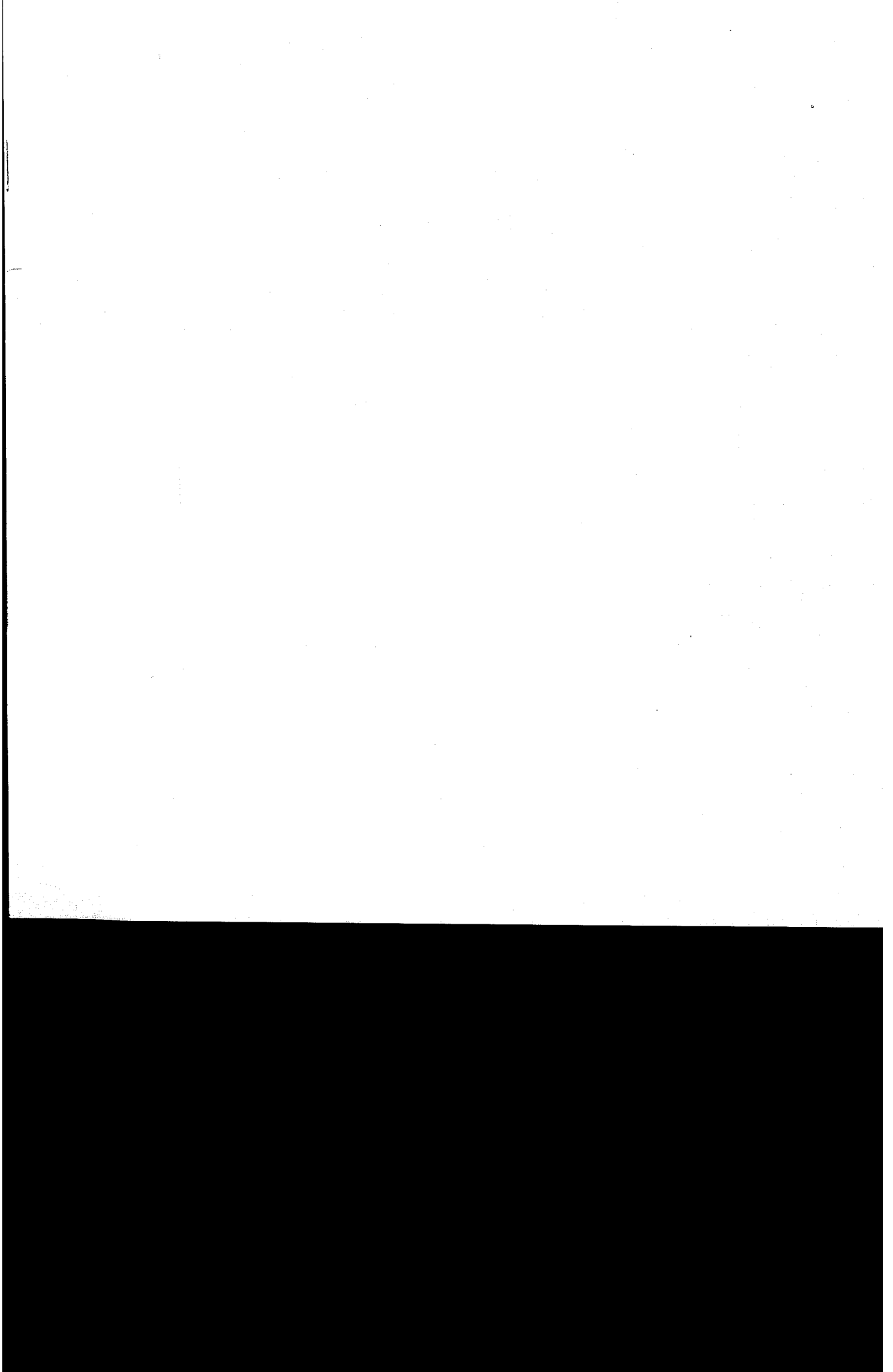

What we claim is:

1. A maximum demand measuring device including in combination an energy quantity indicator having an index hand, an actuator for advancing the hand, a meter for measuring the energy consumption, a plurality of balls corresponding to energy quantities, a disc having a series of concentric ball receiving apertures, means for rotating said disc at constant speed, means governed by said meter for delivering balls into said apertures in the disc proportionally to the energy consumption, means for discharging the balls from said apertures after the lapse of a predetermined time period, means operated by the balls delivered to said disc for advancing said index hand, and means operated by the balls after they have been in said apertures for said predetermined time period for retracting the actuator from the index hand.

2. A maximum demand measuring device including in combination an energy quantity indicator having an index hand, an actuator for advancing the hand, a meter for measuring energy consumption, an apertured disc rotated by said meter, a second disc having an endless series of ball receiving apertures, a ball conveying conduit for delivering balls to the apertures in said second disc, the delivery of balls from the conduit to the disc being governed by said apertured meter driven disc, means for rotating said second disc at constant speed, means for discharging the balls from said apertures after the lapse of a predetermined time period, means operated by the balls delivered to said disc for advancing said index hand, and means operated by the balls after they have been in said apertures for said predetermined time period for retracting the actuator from the index hand.

3. A maximum demand measuring device including in combination an energy quantity indicator having an index hand, an actuator for advancing the hand, a meter for measuring energy consumption, a plurality of balls corresponding to energy quantities, a disc having a series of concentric ball receiving apertures, means for rotating said disc at constant speed, means governed by said meter for delivering balls into said apertures in the disc proportionally to the energy consumption, means for discharging the balls from said apertures after the lapse of a predetermined time period, a differential gear mechanism having a star wheel rotated by the balls contiguous to their point of delivery to the disc for advancing said actuator and having another star wheel rotated by the balls at a point substantially diametrically opposite the first star wheel for retracting said actuator.

4. A maximum demand measuring device including in combination an energy quantity indicator, a meter for measuring energy consumption, a plurality of balls corresponding to energy quantities, a rotatable disc having an endless series of ball receiving apertures, means for rotating said disc at constant speed, a stationary disc located beneath said rotatable disc for supporting the balls in the apertures in the rotatable disc, said stationary disc having a ball discharging orifice, and means cooperating with balls delivered to the rotatable disc at a point near the delivery point for advancing said indicator.

5. A maximum demand measuring device including in combination an energy quantity indicator having an index hand, an actuator for advancing the hand, a meter for measuring energy consumption, a plurality of balls corresponding to energy quantities, a rotatable disc having an endless series of ball receiving apertures, means for rotating said disc at constant speed, a stationary disc located beneath said rotatable disc for supporting the balls in the apertures in the rotatable disc, said stationary disc having a ball discharging orifice, means cooperating with balls delivered to the rotatable disc at a point near the delivery point for advancing said actuator, and means cooperating with balls in the rotatable disc